J. FALLOWS,

Assignor, by mesne assignments, to H. WHITNEY & E. D. GOODRICH.

Sheet-Metal Spoon.

No. 8,650. Reissued April 1, 1879.

WITNESSES
A. J. Gettinger
H. E. Raymond 2d

Elijah D. Goodrich & Horace Whitney assignees of James Fallows by Atty
Thos. Wm. Clarke
INVENTOR.

N. PETERS, PHOTO-LITHOGRAPHER, WASHINGTON, D. C.

UNITED STATES PATENT OFFICE.

HORACE WHITNEY AND ELIJAH D. GOODRICH, OF CAMBRIDGE, MASS., ASSIGNEES, BY MESNE ASSIGNMENTS, OF JAMES FALLOWS.

IMPROVEMENT IN SHEET-METAL SPOONS.

Specification forming part of Letters Patent No. 49,471, dated August 15, 1865; Reissue No. 8,650, dated April 1, 1879; application filed November 18, 1878.

*To all whom it may concern:*

Be it known that JAMES FALLOWS, of the city of Philadelphia, in the State of Pennsylvania, did invent a new and useful Improvement in Sheet-Metal Spoons, of which invention the principal part was an improvement in the construction of the handle and did not involve any change in the bowl; and we do hereby declare that the following is a full, clear, and exact description of the construction of the same, reference being had to the accompanying drawings, making a part of this specification, in which—

Figure 1:
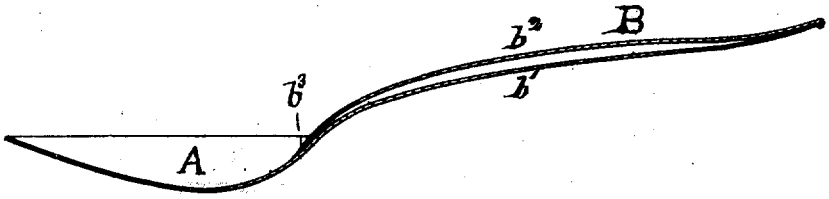
Figure 2:
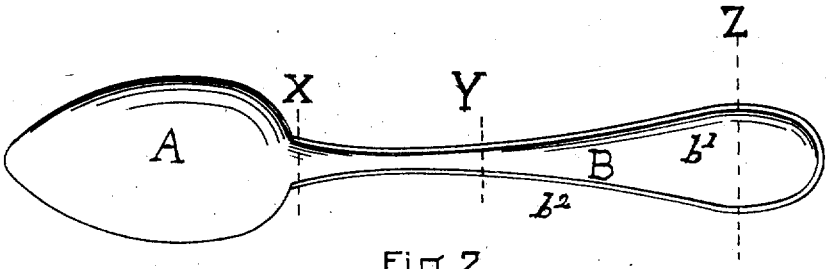
Figure 3:
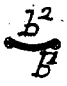
Figure 4:
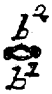
Figure 5:
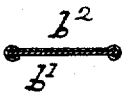

Figure 1 is a longitudinal central section of a sheet-metal spoon of the improved construction; Fig. 2, a representation of the under side of the same; and Figs. 3, 4, and 5, transverse sections of the handle on the respective dotted lines *x y z* of Fig. 2.

Like letters of reference indicate the same parts when in the different figures.

Letters Patent of the United States dated June 13, 1865, were granted to Porter and Booth, as assignees, for an improvement in sheet-metal spoons or forks; the nature of which improvement consists in making the handles of two pieces of sheet metal lapped together in a peculiar manner and afterward attached to the bowl, and, finally, passed through a bath of melted metal, so as to cement all the joints securely together and coat the spoon or fork at one operation, for the purpose of producing a more light, cheap, and merchantable article.

The object of the present improvement is substantially the same, and the two halves of the handle are also lapped together and cemented substantially in the same manner, also, but with this difference, that whereas in the said patented spoon the handle and bowl consist of three pieces of the sheet metal, in the present case the handle and bowl consist of but two pieces only, and, therefore, still further economizes in the manufacture.

In the drawings, A is the bowl, and B the handle. The bowl A and the bottom half, $b^1$, of the handle B are cut together out of the same piece of sheet metal, and are also simultaneously "formed up" in suitable dies at one operation.

The upper half, $b^2$, of the handle B is cut out as much larger than the bottom half, $b^1$, as will allow the edges of the said part $b^2$ to be lapped down upon the part $b^1$, and upon the inner side of the bowl A at $b^3$, respectively, as shown in the drawings, after the said parts $b^1$ $b^2$ have been formed up and ornamented in suitable dies. The two parts $b^1$ $b^2$ are then adjusted together, and the laps closed down properly in a suitable die, and finally taken out and passed through a bath of melted tin, so as to cement the joints and coat the whole.

It will be readily seen that by making the one half of the handle and the bowl of the spoon of a single piece of sheet metal, as described, the smaller-sized spoons can be made with greater facility and economy.

Having thus fully described the invention, we claim and desire to secure by Letters Patent—

1. The sheet-metal handle whereof one part is continuous with its bowl, and the other part is a re-enforce, said two parts being firmly united together by lapped margins, substantially as described.

2. A sheet-metal bowl having formed in one piece therewith a handle having attached thereto a sheet-metal shell, the longitudinal edges of which are folded over the adjacent edges and closely upon the opposite margins of the said handle, while the inner end of said shell rests against and is fastened to the surface of the bowl, substantially as and for the purposes set forth.

3. The sheet-metal handle whereof one part is continuous with its bowl and the other part is a re-enforce, said two parts being firmly united together by lapped margins and immersion in molten metal, substantially as described.

HORACE WHITNEY,
ELIJAH D. GOODRICH,
*Assignees.*

Witnesses:
F. F. RAYMOND, 2d,
GEO. F. WALKER.